(12) United States Patent
van Lammeren et al.

(10) Patent No.: US 9,419,465 B2
(45) Date of Patent: Aug. 16, 2016

(54) WIRELESS CHARGER

(71) Applicant: NXP B.V., Eindhoven (NL)

(72) Inventors: Johannes Petrus Maria van Lammeren, Beuningen (NL); Klaas Brink, Waalre (NL); Aliaksei Vladimirovich Sedzin, Eindhoven (NL); Wihelmus H. C. Knubben, Susteren (NL)

(73) Assignee: NXP B.V., Eindhoven (NL)

( * ) Notice: Subject to any disclaimer, the term of this patent is extended or adjusted under 35 U.S.C. 154(b) by 420 days.

(21) Appl. No.: 13/735,288

(22) Filed: Jan. 7, 2013

(65) Prior Publication Data

US 2014/0191710 A1    Jul. 10, 2014

(51) Int. Cl.
*H02J 7/02* (2016.01)
*B60L 11/18* (2006.01)
*H02J 5/00* (2016.01)
*H02J 7/00* (2006.01)
*H04B 5/00* (2006.01)

(52) U.S. Cl.
CPC ............... *H02J 7/025* (2013.01); *B60L 11/182* (2013.01); *B60L 11/1833* (2013.01); *H02J 5/005* (2013.01); *H02J 7/0027* (2013.01); *H04B 5/0037* (2013.01); *H04B 5/0031* (2013.01); *H04B 5/0081* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ......... H02J 7/025; H02J 5/005; H02J 7/0027; B60L 11/1833; B60L 11/182; H04B 5/0037; H01H 9/0005
USPC ........................................................ 320/108
See application file for complete search history.

(56) References Cited

U.S. PATENT DOCUMENTS

| | | | |
|---|---|---|---|
| 7,834,742 B2 | 11/2010 | Amtmann | |
| 8,212,518 B2 | 7/2012 | Pijnenburg et al. | |
| 8,238,823 B2 | 8/2012 | Maugars et al. | |
| 2004/0130915 A1 | 7/2004 | Baarman | |
| 2005/0017677 A1 | 1/2005 | Burton et al. | |
| 2009/0230777 A1* | 9/2009 | Baarman et al. | 307/104 |

(Continued)

FOREIGN PATENT DOCUMENTS

| | | |
|---|---|---|
| GB | 792 319 A | 3/1958 |
| WO | 2012/090030 A1 | 7/2012 |
| WO | WO 2012090030 A1 * | 7/2012 |

OTHER PUBLICATIONS

Extended European Search Report for application 13199576.3 (May 15, 2014).

(Continued)

*Primary Examiner* — Samuel Berhanu
*Assistant Examiner* — Tessena Kebede

(57) ABSTRACT

A wireless charger is disclosed. The charger contains a coil with a plurality of taps, thereby facilitating charging according to different frequencies and standards. Detection of the standard appropriate to a particular receiver may be accomplished by modulation of the power carrier or via low power modalities, including NFC or Bluetooth.

3 Claims, 1 Drawing Sheet

(56) References Cited

U.S. PATENT DOCUMENTS

| | | | |
|---|---|---|---|
| 2010/0039234 A1* | 2/2010 | Soliven et al. | 340/10.1 |
| 2010/0073143 A1 | 3/2010 | Schaffler | |
| 2010/0207575 A1* | 8/2010 | Pijnenburg et al. | 320/108 |
| 2010/0308939 A1* | 12/2010 | Kurs | 333/219.2 |
| 2011/0136550 A1 | 6/2011 | Maugars | |
| 2012/0062358 A1 | 3/2012 | Nowottnick | |
| 2012/0242164 A1* | 9/2012 | Teggatz et al. | 307/104 |
| 2012/0326658 A1 | 12/2012 | Kim et al. | |

OTHER PUBLICATIONS

"Qi System Description Wireless Power Transfer—vol. 1: Low Power, Part 1: Interface Definition, Version 1.1.1"; 130 pages. (Jul. 2012).

Strommer, Esko, et al; "NFC-Enabled Wireless Charging"; 2012 4$^{th}$ Intl Workshop on Near Field Communication; IEEE Computer Society; 6 pages. (2012).

"GBI Research Report—Wireless Charging Market to 2016—Stnadardization to Increase Uptake and Drive Growth"; 49 pages. (Feb. 2012).

* cited by examiner

WIRELESS CHARGER

FIELD OF THE INVENTION

This invention relates generally to wireless charging pads and methods for their use. More particularly, it relates generally to wireless charging pads utilizing a single coil with multiple taps.

BACKGROUND OF THE INVENTION

Many equipments or devices, including, for example, mobile phones and electronic equipment, to name but a few, contain rechargeable batteries. An increasingly popular method of recharging such rechargeable batteries is wireless or inductive charging. An example of the use of wireless charging is provided in U.S. Pat. No. 8,212,518. It is common to refer to the charging apparatus as the "transmitter" or "charging pad" or "pad" and to the device or equipment being charged as the "receiver".

Unfortunately, there are different standards and procedures for charging electronic equipment or devices. Consequently, effective charging can only be accomplished when the electronic equipment or device is matched with a charger that charges according to the standard or procedures specified by the maker of the equipment or device. For example, various standards may differ in the principles of power transfer, frequencies used, presence of device detection and communication protocols.

SUMMARY OF THE INVENTION

Illustrative embodiments of the invention include an apparatus for wirelessly charging a receiver including a coil having one or more taps; each of the taps being connected to a transmitter; and a controller capable of directing the transmitter to provide charging energy via that portion of the coil energized via a selected tap. Other embodiments include having each tap connected to a respective transmitter. Another embodiment includes a switch connected between each tap and its respective transmitter. Further embodiments include a controller connected to control each transmitter and open and close the switches. Additional embodiments include an NFC element connected to one of the taps. The NFC element may be a tag or may be an element capable of both transmitting and receiving signals. Furthermore, in other embodiments, the controller may be capable of directing at least one transmitter to transmit a modulated signal on its power carrier. Such modulation may, illustratively be FSK or ASK.

In another embodiment there is an apparatus for wirelessly charging a receiver which includes: a coil with a plurality of taps, each of the taps defining a respective portion of the coil; a plurality of switches, each of the switches being connected to a respective tap; a plurality of transmitters, each of said transmitters being connectable to a respective tap by closing the respective switch; a controller adapted to: (i) close a selected switch; (ii) choose a respective transmitter and cause the transmitter to transmit charging energy through the selected switch and thereby energize a respective portion of the coil; cause the respective transmitter to generate a modulated communication signal.

DETAILED DESCRIPTION OF EXEMPLARY EMBODIMENTS

Figure 1:
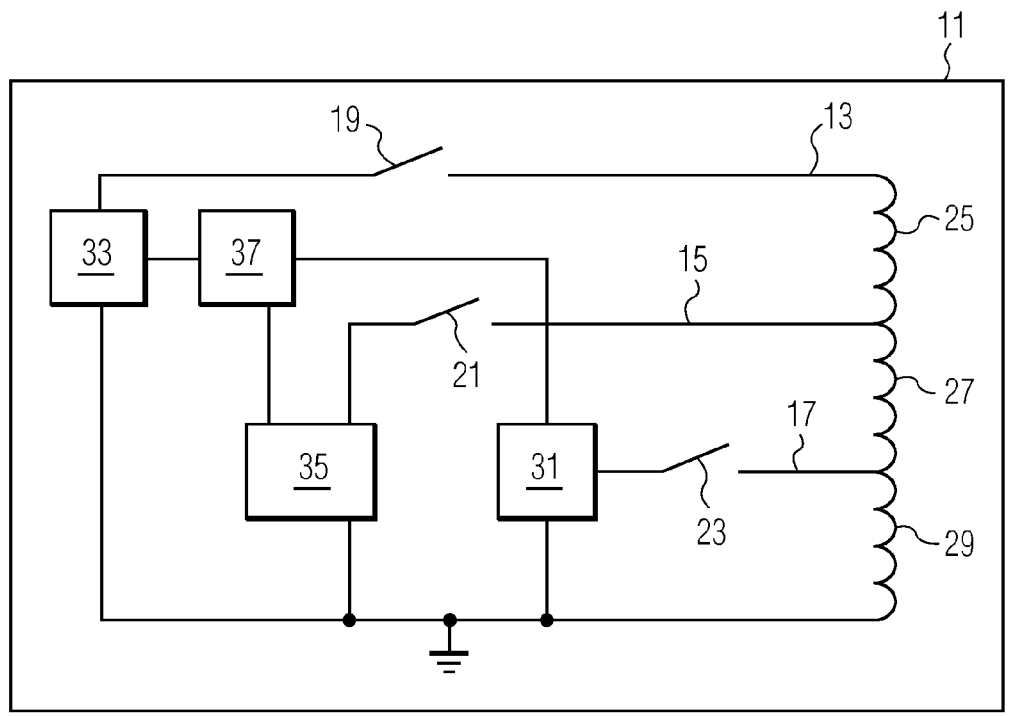
FIG. 1 is a schematic drawing showing an illustrative embodiment of the present invention.

FIG. 1 illustrates a single charging coil with multiple taps. The multiple taps facilitate charging according to a variety of standards and also facilitate communication between the coil (which is located in the pad) and the receiver so that charging according to the appropriate standard may be accomplished.

Reference numeral 11 denotes the pad. A single coil 13 is located within the pad. Taps 15 and 17 are provided at appropriate locations on coil 13. Switches 19, 21, and 23 (which may be transistors, relays, or other types of switches) facilitate the energization of either the entire coil 13, or portions of coil 13 as will be described in further detail.

For example, closing switch or 19, (while allowing other switches 21 and 23 remain open) enables coil segments 25, 27, and 29 together to be energized, via transmitter 33. Alternatively, switches 19 and 23 may be left open and switch 21 closed, thereby energizing only coil segments 27 and 29, via transmitter 35.

By way of example, it may be assumed that closing of switch 19 and resultant energization of coil segments 25, 27, and 29 (i.e. entire coil 13) is required to effect charging according to a particular wireless charging standard, i.e. "Standard X". It may be further assumed that closing of switch 21 (and leaving switches 19 and 23 open) and the resultant energization of coil segments 27 and 29 together is required to effect charging according to another wireless charging standard, i.e. "Standard Y". Charging according to additional standards may be accomplished by adding additional taps and switches.

For example, closing of switch 23, while allowing switches 19 and 21 to remain open causes energization of coil segment 29 may be used to effect charging according to another wireless charging standard, i.e. "Standard Z". Alternative embodiments may include a coil with more taps and transmitters and switches. One may detect which standard is required by a particular receiver by following an iterative process further described below that involves detection of the presence of a receiver, followed by an attempt at communication (either by modulation on a power carrier or by low power communication via NFC) and then, if communication is established, charging via energization of the appropriate coil segment(s) (or the entire coil, if appropriate).

Controller 37 may control the operation of transmitters 31, 33 and 35. Controller 37 may also be configured to open and close switches 19, 21, and 23.

Communication between the receiver and the pad may be accomplished via various forms of modulation at various carrier frequencies. For example, controller 37 may be programmed to provide charging using "Standard X" by utilizing energy transmitted from transmitter 33 via closure of switch 19. Standard X may require energy transmission via a first frequency, illustratively between 100 and 200 kHz. Controller 37 may cause transmitter 33 to transmit an initial low energy burst at the first frequency. Communication with the receiver may be accomplished via, for example, ASK modulation on the first frequency carrier. Presence of the receiver may be detected through load detection (i.e. impedance change). The receiver may be configured to harvest some of the transmitted energy to enable it to reply, also perhaps via ASK modulation on the first frequency carrier. In the event that the ASK modulated reply indicates that the receiver is compliant with Standard X, controller 37 directs transmitter 33 to transmit at higher power at the first frequency to accomplish charging of the receiver.

Should there be no response to the ASK modulated signal transmitted by the pad, an attempt may be made to determine if the receiver is compatible with charging at another standard, for example, "Standard Y". The above procedure—or a similar procedure—may be performed again. Controller 37 may open switch 19 and close switch 21. Controller 37 may direct transmitter 35 to attempt to establish communication at a second frequency (which may, illustratively be between 100 and 300 kHz), utilizing, perhaps another type of modulation, illustratively, FSK on the carrier. Presence of the receiver may again be confirmed by load detection (i.e. impedance change). (The same type of modulation may also be used in other embodiments.) If the receiver's charging requirements are compatible with Standard Y, it will harvest some of the initial burst of energy to reply via FSK at the same carrier frequency. In the event that communication indicates that the receiver is compatible with Standard Y charging, controller 37 may direct transmitter 35 to transmit at higher power at the second frequency to accomplish charging of the receiver according to Standard Y. A similar process may be followed to determine if charging should proceed according to Standard Z.

A charging pad may, in other embodiments, be configured to provide communication regarding the appropriate charging standard by utilizing various modulation techniques on the carrier and also using low power communication channels, such as NFC.

Figure 2:
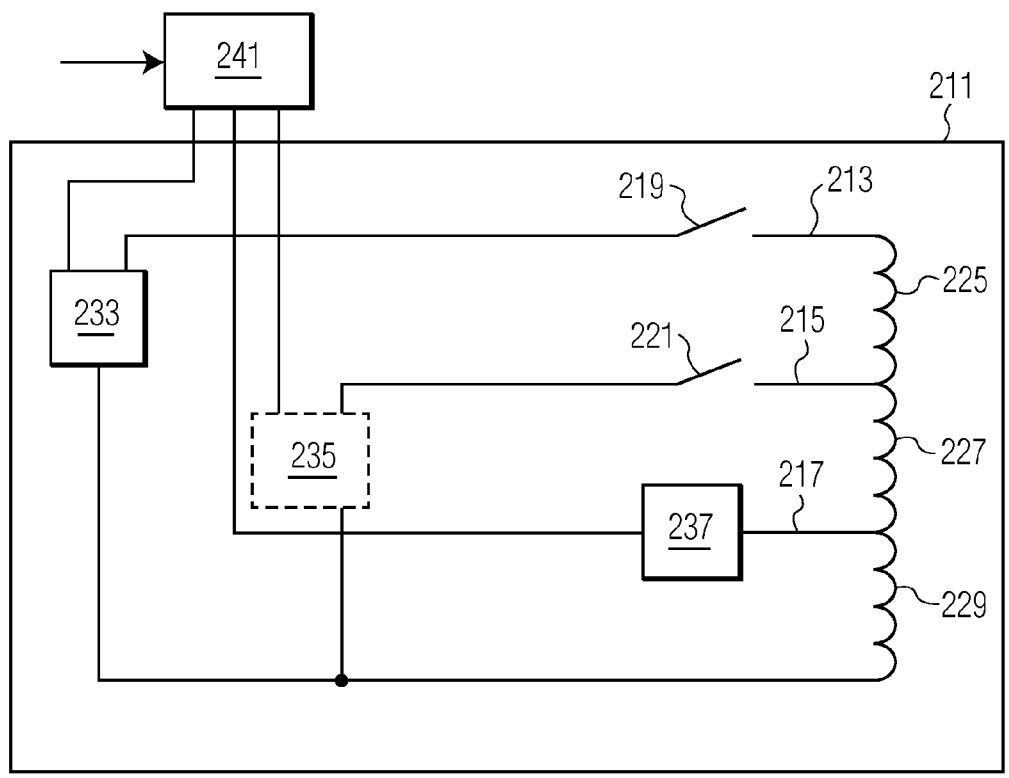
FIG. 2 is a schematic drawing showing another illustrative embodiment of the present invention.

Another embodiment of the invention is disclosed in FIG. 2. Reference numeral 211 denotes a pad. A single coil 213 is located within the pad. Taps 215 and 217 are provided at appropriate locations on coil 213. Switches 219 and 221 (which may be transistors, relays, or other types of switches) facilitate energization of the entire coil 213 or portions or coil 213 as will be described in further detail.

Controller 241 controls switches 219 and 221 and is capable of opening one and closing the other as desired. Reference numerals 233 and 235 denote transmitters capable of providing charging energy according to the requirements of different standards.

In operation, controller may close switch 219, while leaving switch 221 open, thereby permitting transmitter 233 to transmit energy via entire coil 213. Alternatively, controller may close switch 221, while leaving switch 219 open, thereby permitting transmitter 235 to transmit energy via combined coil segments 227 and 229.

Communication between controller 241 and the receiver is accomplished by NFC element 237 which utilizes coil segment 229 to tune to the NFC carrier, i.e. 13.56 MHz. NFC element may be (i) an NFC passive tag or (ii) an NFC transceiver (which is capable of performing as reader/writer in peer to peer or card emulation modes). In operation, either the receiver or pad 211 may initiate communication. (In embodiments in which pad 211 initiates communication, NFC element 237 is capable of transmitting.) After communication via NFC is established, information concerning the appropriate charging standard is transmitted via NFC element 237 to controller 241 which then selects the appropriate transmitter, i.e. 233 or 235 and closes the associated switch, i.e. 219 or 221 to begin charging Various exemplary embodiments are described in reference to specific illustrative examples. The illustrative examples are selected to assist a person of ordinary skill in the art to form a clear understanding of, and to practice the various embodiments. However, the scope of systems, structures and devices that may be constructed to have one or more of the embodiments, and the scope of methods that may be implemented according to one or more of the embodiments, are in no way confined to the specific illustrative examples that have been presented. On the contrary, as will be readily recognized by persons of ordinary skill in the relevant arts based on this description, many other configurations, arrangements, and methods according to the various embodiments may be implemented.

To the extent positional designations such as top, bottom, upper, lower have been used in describing this invention, it will be appreciated that those designations are given with reference to the corresponding drawings, and that if the orientation of the device changes during manufacturing or operation, other positional relationships may apply instead. As described above, those positional relationships are described for clarity, not limitation.

The present invention has been described with respect to particular embodiments and with reference to certain drawings, but the invention is not limited thereto, but rather, is set forth only by the claims. The drawings described are only schematic and are non-limiting. In the drawings, for illustrative purposes, the size of various elements may be exaggerated and not drawn to a particular scale. It is intended that this invention encompasses inconsequential variations in the relevant tolerances and properties of components and modes of operation thereof. Imperfect practice of the invention is intended to be covered.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

What is claimed is:

1. An apparatus for wirelessly charging a receiver comprising:
   a coil having two or more taps;
   an NFC passive tag or NFC transceiver connected to one of the taps and configured to communicate with the receiver via the taped portion of the coil to identify an appropriate charging standard for the receiver;
   at least two transmitters connected to the coil, wherein each transmitter implements a different wireless charging standard;
   a transmitter-specific switch connected between the coil and the each transmitter, wherein at least one of the transmitters is connected to the coil via one of the taps; and
   a controller configured to control the transmitter-specific switches and the transmitters in response to information from the NFC passive tag or NFC transceiver to select the appropriate charging standard and provide charging energy via the respective transmitter.

2. An apparatus for wirelessly charging a receiver comprising:
   a coil with a plurality of taps, each of said taps defining a respective portion of said coil;
   a plurality of switches, each of said switches being connected to a respective tap;

a plurality of transmitters, each of said transmitters being implements a different charging standard and being connectable to a respective tap by closing said respective switch;

an NFC passive tag or NFC transceiver connected to one of the taps and configured to communicate with the receiver via the taped portion of the coil to identify an appropriate charging standard for the receiver;

a controller adapted to, in response to information received from the NFC passive tag or NFC transceiver regarding the appropriate charging standard:

(i) close a selected switch;

(ii) choose a respective transmitter that corresponds to the appropriate charging standard and cause said transmitter to transmit charging energy through said selected switch and thereby energize said respective portion of said coil;

(iii) cause said respective transmitter to transmit a modulated communication signal.

3. An apparatus for wirelessly charging a receiver comprising:

a coil with a transmitter tap and an NFC tap, each of the transmitter tap and the NFC tap defining a respective portion of the coil;

first and second transmitters, the first transmitter being implements first wireless charging standard that operates at a first frequency and connectable to the coil by closing a first switch and the second transmitter being implements a second wireless charging standard that operates at a second frequency and connectable to the coil via the transmitter tap by closing a second switch;

an NFC passive tag or NFC transceiver connected to the NFC tap and configured to communicate with the receiver via the taped portion of the coil to identify an appropriate charging standard for the receiver;

a controller adapted to, in response to information received from the NFC passive tag or NFC transceiver regarding the appropriate charging standard:

(i) close one of the first and second switches to implement either the first or the second wireless charging standard; and (ii) cause the respective transmitter to transmit charging energy through the selected switch and thereby energize the respective portion of the coil.

\* \* \* \* \*